July 27, 1948.  L. L. LIBBY ET AL  2,445,786
DIRECTION FINDER COLLECTOR UNIT
Filed Nov. 8, 1945  3 Sheets-Sheet 1

*Fig. 1.*

INVENTORS
LESTER L. LIBBY
FRED C. WALLACE
BY
Percy P. Lantzy
ATTORNEY

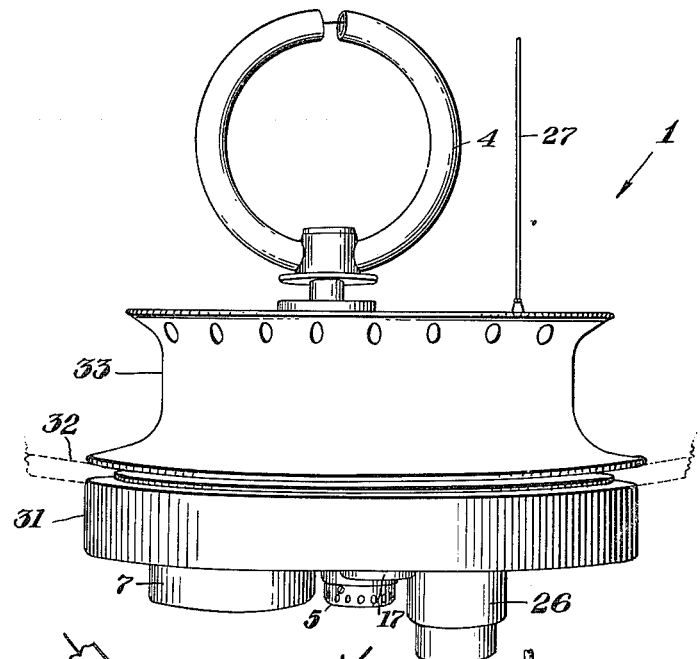
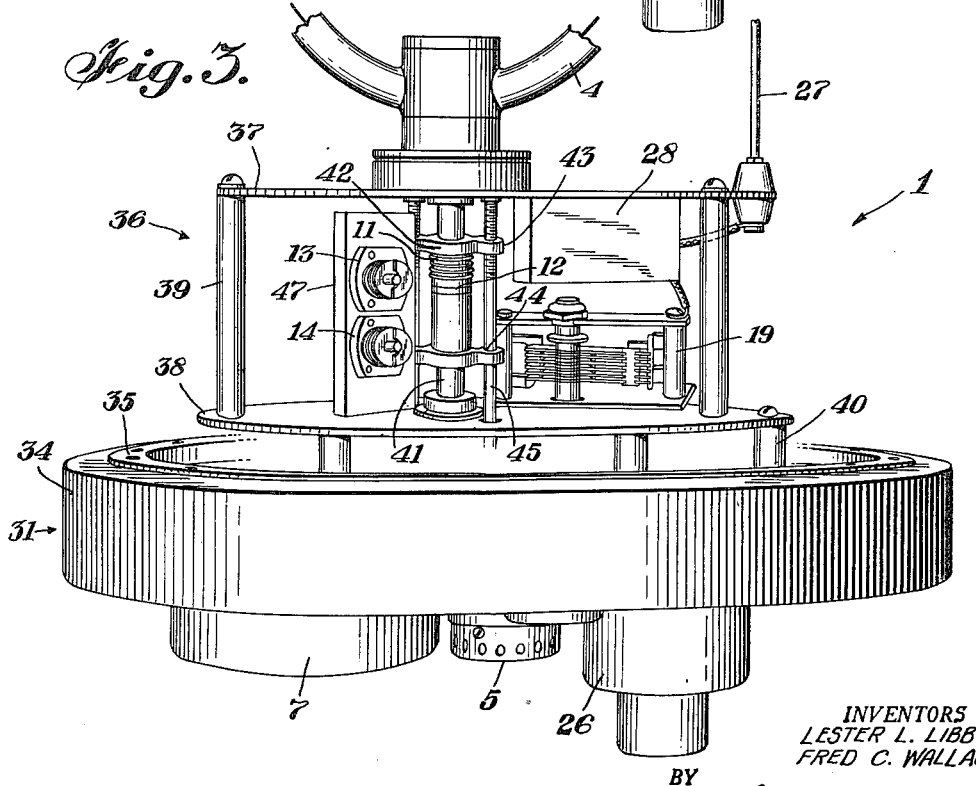

July 27, 1948.                L. L. LIBBY ET AL                2,445,786
                        DIRECTION FINDER COLLECTOR UNIT
Filed Nov. 8, 1945                                         3 Sheets-Sheet 3

INVENTORS
LESTER L. LIBBY
FRED C. WALLACE
BY
Percy P. Lantz
ATTORNEY

Patented July 27, 1948

2,445,786

UNITED STATES PATENT OFFICE 2,445,786

DIRECTION FINDER COLLECTOR UNIT

Lester L. Libby, East Orange, N. J., and Fred C. Wallace, New York, N. Y., assignors to Federal Telephone and Radio Corporation, New York, N. Y., a corporation of Delaware Application November 8, 1945, Serial No. 627,494

8 Claims. (Cl. 343—118)

This invention relates to direction finder collector units, particularly of the type in which the unit is separate and remote from the rest of the direction finder.

An object of the present invention is the provision of an improved direction finder collector unit characterized by compact and convenient construction, and in which the high frequency portions are isolated and shielded from the low frequency and power devices in said unit.

Another object of the present invention is the provision of an improved direction finder collector unit providing improved band-shifting means.

Other and further objects of the present invention will become apparent and the invention will be best understood from the following description of an embodiment thereof, reference being had to the drawings, in which:

Fig. 1 is a schematic diagram of a direction finder, including a collector unit, embodying this invention;

Fig. 2 is a side elevational view of a direction finder collector unit, embodying this invention, with the housing in place;

Fig. 3 is a similar view with the housing removed;

Figure 4:
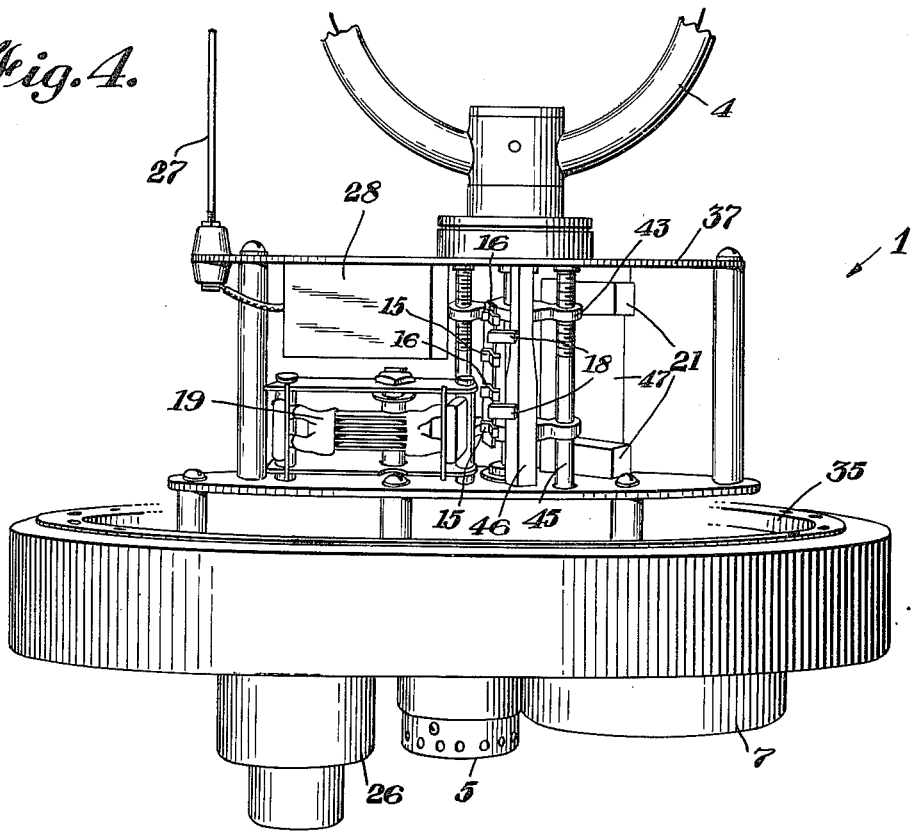
Fig. 4 is a view similar to Fig. 3 but taken on the opposite side of the unit.

Referring now to Fig. 1, the direction finder there illustrated consists primarily of three main units: the direction finder collector unit generally designated by the numeral 1, a receiver 2, and a cathode ray oscillograph tube 3. The collector unit may be separate from the receiver and remote therefrom.

Unit 1 includes a single-turn shielded rotatable loop 4 rotated or driven by a motor 5 remotely controlled from a switch 6 in the receiver 2. The motor 5 drives a two-phase generator 7 also contained in unit 1, the output of the two-phase generator being applied through couplers 8 to the deflection plates of the cathode ray oscillograph tube 3. The output of the receiver likewise is applied to the deflection plates through said couplers 8. The two-phase current is used to provide a circular sweep on the screen of the cathode ray oscillograph tube 3.

Within unit 1, the high frequency output of the single turn shielded loop 4 is applied to the primary 9 of a rotatable coupler 10 having two secondary coils 11 and 12, for low frequency and high frequency operation, respectively. Secondaries 11 and 12 have trimmer condensers 13 and 14 shunted across each of them, respectively, for fixing the maximum frequencies to which said secondaries are tuned. The ends of secondary 11 are connected to a pair of contacts 15, while the ends of secondary 12 are connected to a pair of contacts 16. A band-switch motor 17 is employed to alternately move one or the other of the secondary coils 11 or 12 into coupling relationship with the rotating primary 9, as well as to move the contacts associated with the coupled coil into contact with a pair of brushes 18. Brushes 18 connect whichever of the secondary coils 11 or 12 is in coupling relationship with coil 9, to a tuning condenser 19 and a cathode follower coupler 20, all contained within unit 1. Movement of the secondary coils 11 or 12 into either extreme position actuates one or the other of a pair of limit switches 21. When the secondary coils 11 and 12 reach one of the limits of their direction of travel that one of the limit switches is opened through which current has been delivered from the receiver to actuate the band-switch motor 17, thereby stopping the band-switch motor 17. When the band-switch 22 on the receiver is next moved to the opposite position as for example, from low to high, current is again fed to the band-switch motor but in the opposite direction and with the opposite polarity to cause the motor to reverse and move the other secondary into coupling relationship with the rotating primary 9 of the rotatable coupler 10, and its contacts in association with brushes 18. The output of the cathode follower coupler 20 is fed through a line 23 to the direction finding receiver 2. Tuning of the tuning condenser 19 in unit 1 is accomplished from the receiver 2 by turning the tuning dial 24 which is used to drive a synchro-generator (not shown), which generator is coupled over line 25 to a synchro-motor 26 which may be of any suitable type, such as for example, a Selsyn or servomotor or the like. This motor 26 in turn controls condenser 19.

For sensing purposes, a sensing antenna 27 may be provided adjacent the rotating loop 4, the antenna 27 being connected to a sense relay 28 which is controlled over a line 29 by a switch 30 on the panel of the receiver 2. The sense relay may include proper phasing means for sensing purposes as well as a relay mechanism. The high frequency output of the sense relay 28 is in turn fed to the input of the cathode follower coupler 20 and thence to the receiver 2.

Referring now to Figs. 2–5 in which the physical arrangement of unit 1 is depicted and particularly to Fig. 2, all the parts of said unit are assembled around a base 31 which may be adapted to fit inside the fuselage or inside a wing of a plane as indicated at 32, the portion above the base 31 being protected by a stream-lined neck or housing member 33, which may be in the form of a casting and which is removable to give access to various elements of unit 1. The rotating loop antenna 4 and the sense antenna 27 both project above the member 33 and may be enclosed in a tear-drop type plastic housing (not shown) when said unit is used on a plane.

Referring to Fig. 3 the base 31 consists of a hollow oval-shaped portion 34, which may be a casting, within which is arranged a metallic base plate 35. The base plate 35 serves as a mounting for all the elements of unit 1, and also serves as a shield between the high frequency side and the power or low frequency side.

Figure 5:
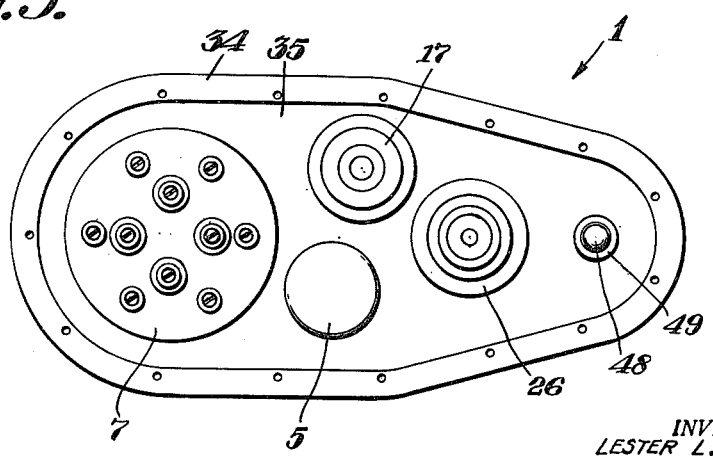
Fig. 5 is a bottom view of the unit.

As illustrated in Fig. 5, there is attached to the underside of the base plate 35, the motor 5 which rotates the loop antenna, the two-phase generator 7, the band switch motor 17 and the synchro-motor 26. The various motors 5, 17 and 26 each have a shaft protruding through the base plate 35, and are connected by various gearing means to the elements which they drive. These elements in turn are mounted on or within a frame 36, consisting of a top or upper plate 37 and a bottom or lower plate 38 spaced apart and joined by rods 39. The frame 36 is mounted a short distance above the base plate 35 by spacing rods 40, thereby leaving room between the lower plate 38 of the frame and the base plate for various gear trains.

The sense antenna 27 is mounted on the top plate 37 at one end thereof with the sense relay 28 mounted underneath the top plate 37 immediately adjacent the sense antenna.

The rotating loop is mounted for rotation on the top of the top plate 37 toward the center thereof, with a shaft 41, which is attached to said loop and used for the rotation thereof, extending through the top plate 37 and the bottom plate 38 of the frame 36 into the space directly underneath the bottom plate 38 where said shaft has mounted thereon a gear which is in turn driven by a spur gear rotated by motor 5.

The rotatable primary 9 of rotatable coupler 10 rotates with shaft 41. Around shaft 41 is a cylindrical coil-form 42 on which the secondaries 11 and 12 are arranged and vertically spaced from each other. The form 42 has an upper and lower set of arms, 43 and 44 respectively. These sets of arms 43 and 44 have openings therein through which rotatable rods 45 pass, the upper portion of rods 45 being threaded and the openings in the upper set of arms likewise being threaded so that upon rotation of rods 45, the upper set of arms 43 and coil-form 42 are moved upward or downward depending upon the direction of rotation of rods 45. When the coil-form 42 is in its lowest position, the low frequency secondary 11 is coupled to the rotating primary 9, and when coil-form 42 is in its uppermost position, the high frequency secondary 12 is coupled to the rotating primary 9. The rods 45, which move coil-form 42 up and down, are rotated by band-switch motor 17 which is in turn controlled by limit switches 21 (see Fig. 4). One of the switches 21 is arranged near the top plate 37 and stops the upward movement of coil-form 42 when arms 43 or attachments thereto contact the upper of the limit switches 21, and the other limit switch 21 is arranged on the bottom plate 38 of frame 36 and limits the downward movement of coil-form 42 when the lower set of arms 44 or attachment thereto strike this limit switch 21. The contacts 15 and 16 for the secondaries 11 and 12 slide up and down with said secondaries and make contact with brushes 18 which may be in the form of small spring elements (see Fig. 4) mounted on a vertically-arranged insulating member 46 reaching from the top plate 37 to the bottom plate 38. Means are preferably provided for short-circuiting whichever secondary is not connected with brushes 18. The trimmer condensers 13 and 14 (see Fig. 3) are stationary and are mounted on another vertical piece of insulation 47. The trimmer condensers are connected by flexible wires to their associated secondaries.

The tuning condenser 19 is arranged on the bottom or lower plate 38 of frame 36 with its shaft projecting through said plate and having a gear arranged thereon which in turn is rotated by another gear driven by the synchro-motor 26. The tube 48 of the cathode follower coupler may be arranged over the base plate 35 or may be hung under it as shown in Fig. 5. A shield 49 is arranged around said tube, however, to prevent interaction between the tube and the low frequency and power elements which are also arranged underneath the base plate 35. The shield 49 may be considered as virtually a part of the base plate 35 in that it also isolates tube 48 from the elements below base plate 35.

While the streamline configuration of the base 34, housing member 33 and the general lay-out of the frame and elements thereon are particularly adapted, in the embodiment thus described, for use on aircraft to provide for relatively small wind resistance, this unit may also be used on ship-board or other craft which are slower moving than aircraft and consequently do not require such streamlining. In such case, the configuration of the base may be square or round or any other desired shape. This unit furthermore may be used on a land station and provides definite advantages in compactness, convenience and proper separation of the high frequency and low frequency sides of the circuit.

The equipment hereinabove described is particularly adapted for use at higher frequency, such as for example, 20 megacycles. At these higher frequencies, it is necessary to isolate the high frequency side and this is accomplished in the hereinabove-described unit.

In one particular embodiment constructed in accordance with the foregoing description, the motor 5 was adapted to rotate at 7000 R. P. M. with the loop rotating at 1100 R. P. M. Suitable reduction gearing was provided between the motor 5 and the loop. The two-phase generator 7 was driven at the same speed as the loop and was geared thereto in a one-to-one ratio.

While we have described above the principles of our invention in connection with specific apparatus, it is to be clearly understood that this description is made only by way of example and not as a limitation on the scope of our invention as defined in the accompanying claims.

We claim:

1. A direction finder collector unit comprising a base plate having a rotatable antenna and adjustable radio frequency tuning means coupled thereto on one side of said base plate; and motor means for rotating said loop antenna and varying said adjustable radio frequency tuning means mounted on the other side of said base plate, said base plate comprising a radio frequency shield.

2. A direction finder collector unit comprising a base plate having a rotatable loop antenna, a rotatable coupler coupled to said loop antenna, a tuning condenser, and frequency band-switching means, all arranged on one side of said base plate; and a motor for rotating said loop antenna, a synchro-motor for tuning said condenser and a band-switch motor for operating said band-switching means all arranged on the other side of said base plate.

3. A direction finder collector unit according to claim 2 further including a two phase generator mounted underneath said base plate and mechanically coupled to the motor which rotates the loop antenna.

4. A direction finder collector unit comprising a base plate, a frame supported above said base plate, a rotatable loop antenna mounted on top of said frame, a drive shaft for rotating the loop antenna extending downwardly through said frame, a rotatable coupler coupled to said loop antenna, a tuning condenser arranged in said frame and coupled to said coupler to tune it, frequency band-switching means arranged in said frame, an output coupler coupled to said tuning condenser and rotatable coupler, a motor mounted under the base plate and mechanically coupled to said driving shaft to rotate the loop antenna, a two-phase generator mounted under the base plate and mechanically coupled to said motor, said generator generating energy for rotating the beam in a cathode ray oscillograph tube, a synchro-motor mounted under a base plate and mechanically coupled to said tuning condenser, and a band-switch motor mounted under the base plate and mechanically coupled to said frequency band-switching means.

5. A direction finder collector unit according to claim 4 further including a sense antenna mounted on said frame, a sense relay mounted within said frame adjacent said sense antenna, and means coupling said sense relay to said output coupler.

6. A direction finder collector unit comprising a base plate having mounted on one side thereof, a rotatable directional antenna and an inductive coupler having its primary coil electrically coupled to said antenna and rotatable therewith, said coupler having a plurality of movably mounted secondary coils of different inductive value which may be alternatively coupled to said primary; said base plate having mounted on its other side a motor for rotating said antenna and said primary coil, and means for moving a selected one of said coils into inductive coupling relationship with said primary.

7. A direction finder collector unit comprising a base plate, a frame supported above said base plate, a rotatable loop antenna mounted on top of said frame, a drive shaft for rotating the loop antenna extending downwardly through said frame, a rotatable coupler having its primary rotatably mounted on said shaft and having two secondaries of different inductive value surrounding said shaft and arranged to be alternately moved into and out of coupling relationship with said primary to change the frequency band, fixed contact means, each of said secondaries having separate output contacts movable with and arranged to alternately make contact with said fixed contact means, a tuning condenser arranged in said frame and coupled to said fixed contact means for tuning said secondaries, an output coupler connected to said condenser, a motor mounted under the base plate and mechanically coupled to said drive shaft to rotate the loop antenna, a two-phase generator mounted under the base plate and mechanically coupled to said motor, said generator generating energy for rotating the beam in a cathode ray oscillograph tube, a synchro-motor mounted under the base plate and mechanically coupled to said tuning condenser, and a band-switch motor mounted under the base plate and mechanically coupled to said secondaries to move said secondaries alternately into and out of coupling relationship with said rotatable primary.

8. A direction finder collector unit according to claim 7 wherein said secondaries are mounted on a form surrounding the driving shaft, each of the secondaries having output contact means fixed on said form and movable therewith, screw means for moving said form along said shaft to alternately bring said secondaries into coupling relationship with the rotatable primary on said shaft, and limit switches arranged to be actuated by said form at its farthest position of travel in either of opposite directions, to cut off the power supplied to the band-switch motor, said screw means being mechanically coupled to said band-switch motor and driven thereby.

LESTER L. LIBBY.
FRED C. WALLACE.

REFERENCES CITED

The following references are of record in the file of this patent:

UNITED STATES PATENTS

| Number | Name | Date |
|---|---|---|
| 2,192,321 | Meier | Mar. 5, 1940 |
| 2,202,583 | Hilliard et al. | May 28, 1940 |